(12) United States Patent
Vuillamy et al.

(10) Patent No.: US 8,266,887 B2
(45) Date of Patent: Sep. 18, 2012

(54) ROCKET ENGINE NOZZLE SYSTEM

(75) Inventors: Didier Vuillamy, Quincampoix (FR); Robert Gazave, Panilleuse (FR)

(73) Assignee: SNECMA, Paris (FR)

( * ) Notice: Subject to any disclaimer, the term of this patent is extended or adjusted under 35 U.S.C. 154(b) by 811 days.

(21) Appl. No.: 12/328,166

(22) Filed: Dec. 4, 2008

(65) Prior Publication Data

US 2009/0145134 A1    Jun. 11, 2009

(30) Foreign Application Priority Data

Dec. 6, 2007   (FR) ...................................... 07 59619

(51) Int. Cl.
  *B63H 25/46*   (2006.01)
(52) U.S. Cl. ..................................... 60/222; 239/265.25
(58) Field of Classification Search ............. 60/222, 60/229, 263; 239/265.27, 265.25
  See application file for complete search history.

(56) References Cited

U.S. PATENT DOCUMENTS

| | | | | |
|---|---|---|---|---|
| 3,112,612 A | * | 12/1963 | Berman et al. ................... | 60/228 |
| 3,188,024 A | * | 6/1965 | Schneider ........................ | 244/52 |
| 3,197,959 A | * | 8/1965 | Keller ............................ | 60/224 |
| 3,286,469 A | | 11/1966 | Atherton | |
| 3,314,609 A | * | 4/1967 | Horgan et al. ........... | 239/265.25 |
| 3,486,517 A | * | 12/1969 | Gaura ........................... | 137/832 |
| 3,532,297 A | * | 10/1970 | Maes ............................. | 244/169 |
| 3,802,190 A | * | 4/1974 | Kaufmann ....................... | 60/225 |
| 4,017,040 A | * | 4/1977 | Dillinger et al. ............. | 244/3.22 |
| 4,384,690 A | * | 5/1983 | Brodersen ..................... | 244/3.22 |
| 4,964,340 A | * | 10/1990 | Daniels et al. ................ | 102/377 |
| 6,516,605 B1 | * | 2/2003 | Meholic ........................... | 60/247 |
| 6,761,335 B2 | * | 7/2004 | Goodro et al. ............. | 244/171.1 |
| 6,845,606 B2 | * | 1/2005 | Franchet et al. ................ | 60/225 |
| 7,281,367 B2 | * | 10/2007 | Rohrbaugh et al. ........... | 60/253 |
| 2007/0056261 A1 | | 3/2007 | Lausten et al. | |

OTHER PUBLICATIONS

Hagemann, G., et al., "Advanced Rocket Nozzles," Journal of Propulsion and Power, vol. 14, No. 5, Sep. 1, 1998, pp. 620-634, American Institute of Aeronautics and Astronautics, New York.

* cited by examiner

*Primary Examiner* — Phutthiwat Wongwian
(74) *Attorney, Agent, or Firm* — Weingarten, Schurgin, Gagnebin & Lebovici LLP

(57) ABSTRACT

The rocket engine nozzle system comprises a set of individual nozzles distributed in a ring around a central core of axially symmetrical shape that presents a central axis. Each individual nozzle placed at the periphery of the central core comprises a circular section throat for receiving gas from a combustion chamber, and a diverging portion that is tangential to the central core. The diverging portion has an outlet section that presents first and second lateral sides that converge radially towards the central axis of the central core, a curved outer side having its convex side facing outwards, and an inner side situated in the vicinity of the central core.

7 Claims, 4 Drawing Sheets

ROCKET ENGINE NOZZLE SYSTEM

FIELD OF THE INVENTION

The present invention relates to a rocket engine nozzle system, and more particularly to a nozzle system that comprises a group of individual nozzles.

PRIOR ART

Examples of rocket engine nozzle systems are already known that make use of sets of non-axially symmetrical nozzles that are of rectangular shape and that are fitted to a central core (also known as a "plug").

A rocket engine with a central core and a linear set of individual nozzles of this type has been proposed in particular by the supplier Rocketdyne under the reference XRS-2000 for fitting to the reusable single-stage launcher in the context of the Lockeed-Martin X33 program, which program remains in the state of a project.

FIG. 6 is a diagrammatic perspective view of such an XRS-2200 nozzle system that has remained in the state of a prototype, with a linear central core 20 associated with rows of non-axially symmetrical nozzles 10 of outlet section that is rectangular in shape.

Rocket engines of that type present certain drawbacks in terms of mass or cooling difficulties.

Theoretical proposals have also been made to design a rocket engine nozzle system comprising a central core that is axially symmetrical in shape, essentially frustoconical, together with a set of axially symmetrical nozzles assembled around the central core.

Nevertheless, such axially symmetrical individual nozzles necessarily give rise to flow discontinuities in the gas on leaving the diverging portion of an individual nozzle in order to join the central core. Such discontinuities are not only harmful in terms of aerodynamic performance, but they also give rise to problems involving the thermal resistance of the central core, since the locations where the flows become attached to the central core are subjected to increased heat transfers as a result of the flows being deflected.

OBJECT AND BRIEF SUMMARY OF THE INVENTION

To remedy those drawbacks of the prior art, it is possible, as shown in FIGS. 7 and 8, to envisage placing a set of individual nozzles 201 around an axially symmetrical central core 202, in which the individual nozzles are no longer axially symmetrical, but are made as in the above-mentioned XRS-2200 nozzle system project. Each individual nozzle 201 then comprises a nozzle throat 212 of circular section connected to a combustion chamber 211 and to a diverging portion 213 of outlet section 214 that is essentially rectangular in shape, with inner and outer sides 214a, 214b and two lateral sides 214c, 214d.

Such an arrangement enables certain drawbacks of axially symmetrical nozzles to be remedied, however it does not enable the space around the central core to be optimized, nor does it deal with the problem of flow discontinuity at the outlets from the nozzles, at their inner edges.

The invention seeks to remedy the above-mentioned drawbacks and in particular to enable the space allocated to the individual nozzles around the axially symmetrical central core to be optimized, while nevertheless ensuring high expansion ratios for the gas expelled by the individual nozzles and reducing thermal resistance problems for the central core.

In accordance with the invention, these objects are achieved by rocket engine nozzle system, comprising a set of individual nozzles distributed in a ring around a central core of axially symmetrical shape presenting a central axis, wherein each individual nozzle placed at the periphery of the central core comprises a circular section throat for receiving gas coming from a combustion chamber, and a diverging portion tangential to the central core, and wherein the diverging portion has an outlet section presenting first and second lateral sides that converge radially towards the central axis of the central core, an outer side that is curved with its convex side directed outwards, and an inner side situated in the vicinity of the central core.

Said inner side that is situated in the vicinity of the central core may be straight, but in an advantageous particular embodiment this inner side is curved with curvature close to that of the central core, and said inner side presents continuity of slope in the meridian plane with the central core, i.e. the inner side of the nozzle is tangential to the central core.

The radial lateral sides may be rectilinear, or in a variant embodiment, they may present a certain amount of curvature with a radius that is greater than that of the central core.

In a particular embodiment, the curved outer side of an outlet section of an individual nozzle presents curvature so as to constitute a portion of a circle that is concentric with the central core.

In another particular embodiment, the curved outer side of an outlet section of an individual nozzle presents curvature constituting a portion of an ellipse that presents radii that are smaller than the radius of the central core.

In the present invention, the individual nozzles present outlet sections that are generally trapezoidal in appearance, with each of the outlines thereof having a rectilinear or curvilinear shape specific thereto, depending on constraints of size, of the mechanical strength of the walls, and of optimizing flows.

BRIEF DESCRIPTION OF THE DRAWINGS

Other characteristics and advantages of the invention appear from the following description of particular embodiments, given as examples and with reference to the accompanying drawings, in which.

DETAILED DESCRIPTION OF PARTICULAR EMBODIMENTS

Figure 1:
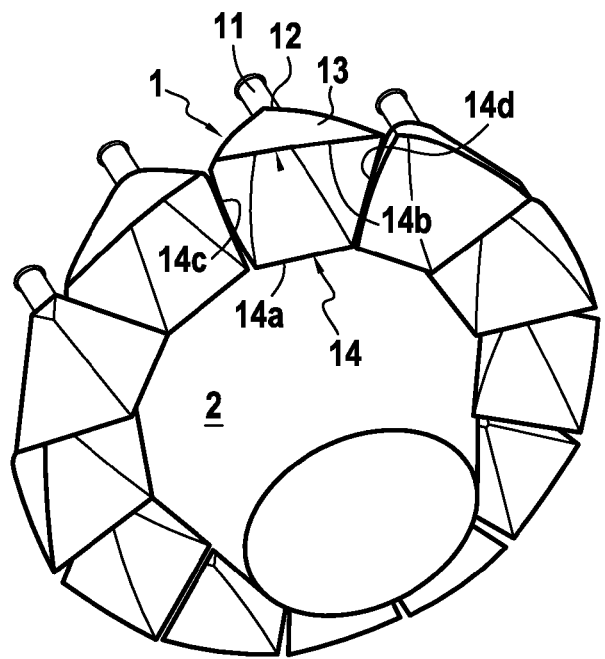
FIG. 1 is a perspective view of an example of a rocket engine nozzle system of the invention.

FIG. 1 is an overall perspective view of a rocket engine nozzle system constituting a particular embodiment of the invention, comprising an axially symmetrical central core 2 of essentially frustoconical shape associated with a set of individual nozzles of non-asymmetrical shape disposed around the core in the form of a ring, the individual nozzles being adapted to optimize the space they occupy and to avoid discontinuities occurring in the gas flows where they leave the individual nozzles 1 to join the outside wall of the central nozzle 1, along which wall the gas coming from the nozzles 1 expands.

Each individual nozzle 1 has a nozzle throat 12 of circular shape connected to a combustion chamber 11, and a diverging portion 13 terminating in an outlet section 14 that is generally trapezoidal in shape, where each of the sides 14a to 14d of this outlet section may be of some particular shape, whether rectilinear or curvilinear, depending on constraints of available space.

Using individual nozzles 1 that are not axially symmetrical makes it possible not only to optimize the space allocated to the nozzles around the central core 2 so as to reduce the discontinuities in combustion gas flow on leaving the nozzles 1 and joining the central core 2, but also to obtain gas expansion ratios in the nozzles 1 that are greater than can be obtained with axially symmetrical nozzles.

Figure 2:
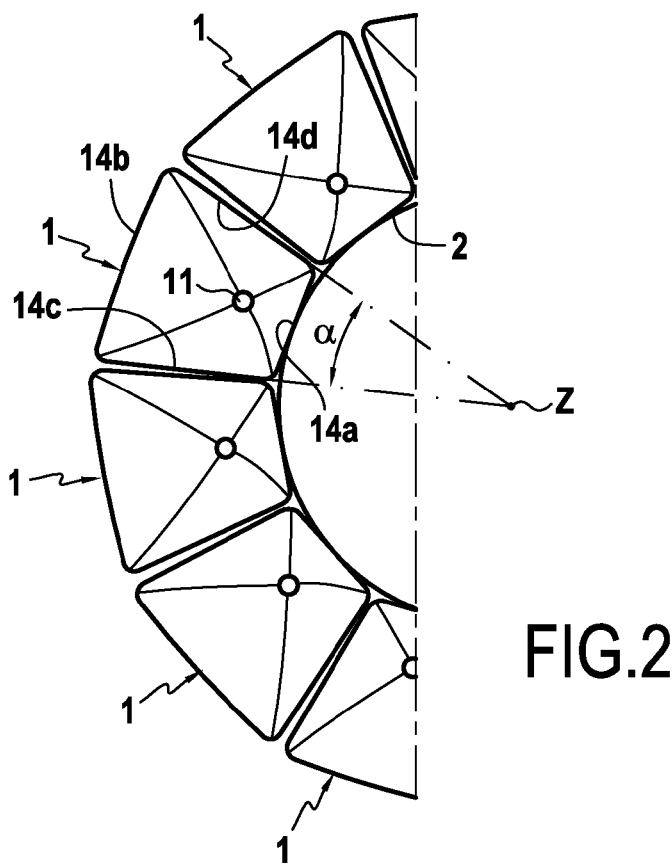
FIG. 2 is a fragmentary plan view showing how the individual nozzles are arranged around a central core in the FIG. 1 embodiment.

In the embodiment of FIGS. 1 and 2, the outlet section 14 of the diverging portion 13 of each individual nozzle 1 presents lateral sides 14c and 14d that converge radially towards the central axis z of the central core 2 so as to form an acute angle α. These radial lateral sides 14c and 14d are preferably rectilinear, but they could be slightly curved. If curved, the radius of curvature of the radial lateral sides 14c and 14d must be very large, e.g. greater than the radius of curvature of the central core.

In FIGS. 1 and 2, it can be seen that the outlet section 14 of the diverging portion 13 of each individual nozzle 1 presents a rectilinear inner side 14a situated close to the central core z. This can simplify fabrication. Nevertheless, in order to avoid any problem of flow discontinuity in the gas leaving the nozzles 1, it is preferable for the inner side 14a situated adjacent to the central core 2 to be curved with curvature close to that of the central core 2, as described below with reference to the embodiment of FIGS. 3 to 5.

In the embodiment of FIGS. 1 and 2, the outlet section 14 of the diverging portion 13 of each individual nozzle 1 advantageously presents an outer side 14b in the form of a circular arc that constitutes a portion of a circle concentric about the axially symmetrical central core 2. This serves to provide the maximum amount of space in an annular space for the flows coming from the nozzles 1.

In general, each individual nozzle 1 presents a throat 12 of circular section and a diverging portion 13 of section that varies regularly so as to reach the desired shape at the outlet section 14 of the nozzle. This variation is computed on the basis of various propulsion performance criteria or of other constraints such as maintaining a cooling film, for example. It may also be observed that the trapezoidal shape of the outlet section 14 of the nozzles 1 provides advantages in terms of the mechanical strength of the walls as a result of the multiple curvatures that are formed in the diverging portion 13.

It should be observed that the face of a diverging portion 13 of a nozzle 1 that comes into contact with the central core 2 is preferably a warped surface with two curvatures. More particularly, a first curvature arc enables the edge of the diverging portion 13 of the nozzle 1 to be in contact with a line parallel to the central core 2, while a second curvature arc enables the nozzle to provide slope continuity in a meridian plane with the central core 2 at the end of the nozzle in the vicinity of its outlet section 14.

Figure 9:
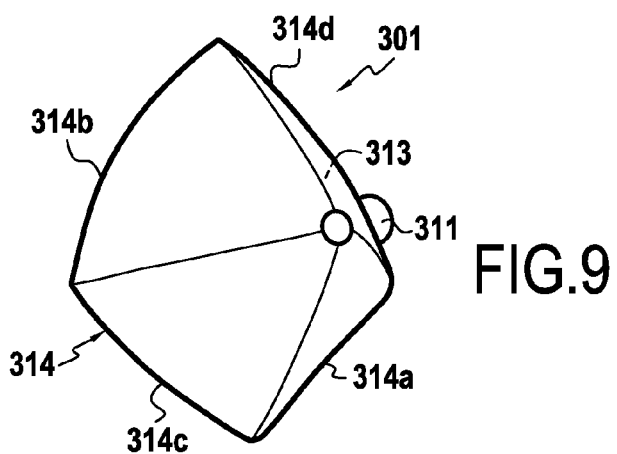
FIGS. 9 and 10 are perspective views of a particular example of an individual nozzle suitable for being implemented in a nozzle system of the invention.
Figure 10:
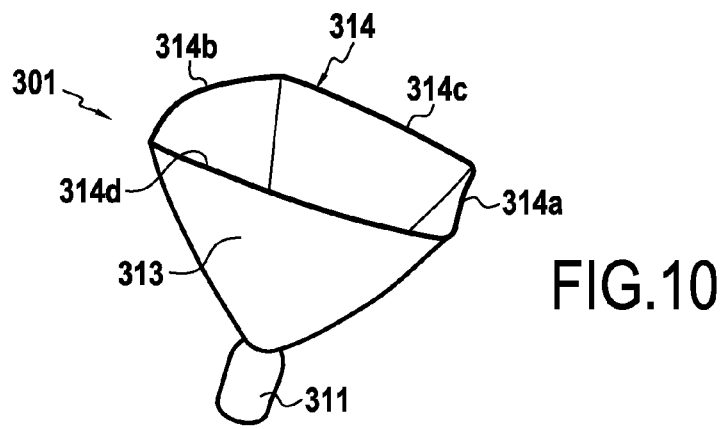

FIGS. 9 and 10 show an example of an individual nozzle 301 with a combustion chamber 311, a nozzle throat 312, and a diverging portion 313 presenting an outlet section 314 having outlines 314a to 314d.

The nozzle 301 presents a diverging portion 313 with a warped surface having double curvature as mentioned above, and terminating in an inner side 314a that matches the shape of the central core.

The relationship between the warped surface having double curvature and the surface of the central core is firstly a condition that the warped surface of the nozzle be tangential to the surface of the central core along the parallel line of contact between them. This results in a nozzle outlet angle that varies along the side 314a within a range of values that is compatible with well-behaved aerodynamic flow.

Figure 11:
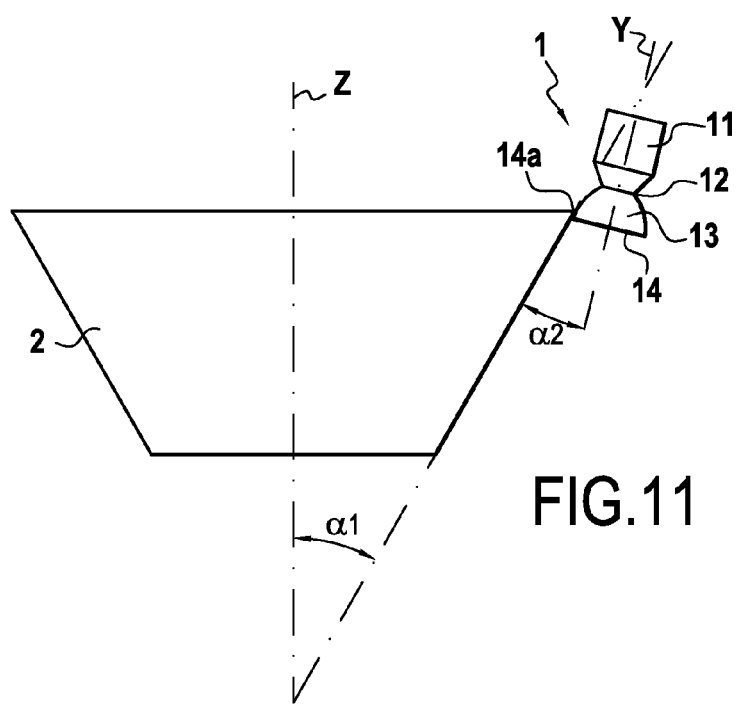
FIG. 11 is a diagrammatic view showing the position of an individual nozzle relative to an axially symmetrical central core.

FIG. 11 shows an example of how an individual nozzle 1 can be positioned relative to an axially symmetrical frustoconical structure 2 in which the outlet angle α2 of the nozzle 1 relative to its axis Y is not necessarily equal to the angle α1 between the side surface of the axially symmetrical frustoconical structure 2 and the axis Z of said structure. The axis Y of each individual nozzle 1 is thus not necessarily parallel to the axis Z of the frustoconical structure 2.

The condition defining the relative position of each individual nozzle 1 and the truncated cone 2 is that the nozzles 1 and the truncated cone 2 must be tangential where they make contact.

Figure 3:
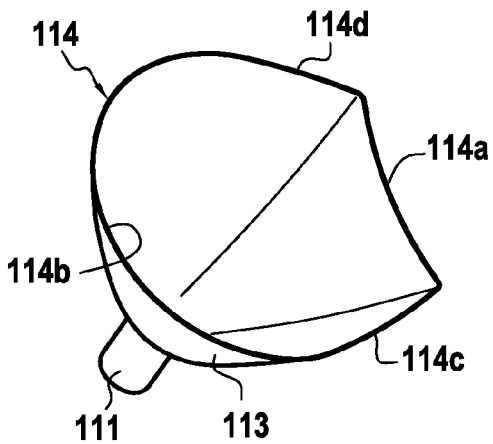
FIGS. 3 and 4 are perspective views of variant embodiments of an individual nozzle of circular section profile over an outer portion, suitable for being implemented in a rocket engine nozzle system of the invention.
Figure 4:
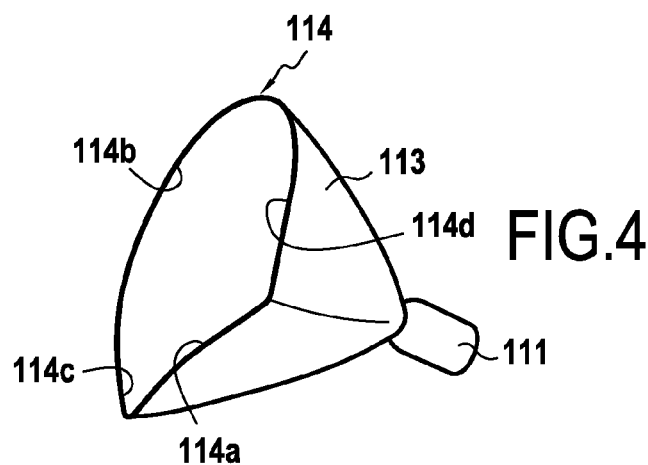
Figure 5:
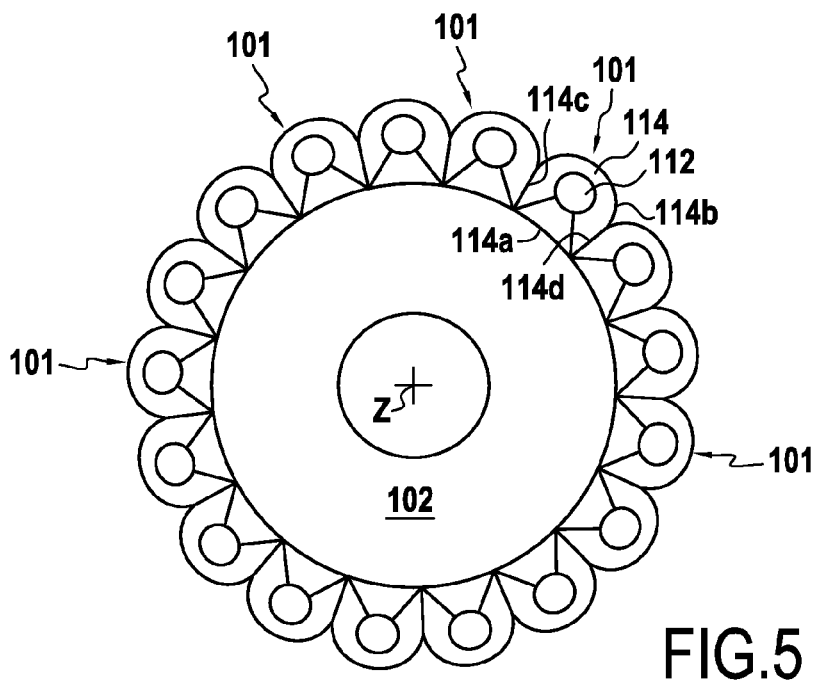
FIG. 5 is a plan view of a particular embodiment of a rocket engine nozzle system of the invention comprising an axially geometrical central core and a ring of individual nozzles in the embodiment of FIGS. 3 and 4.
Figure 6:
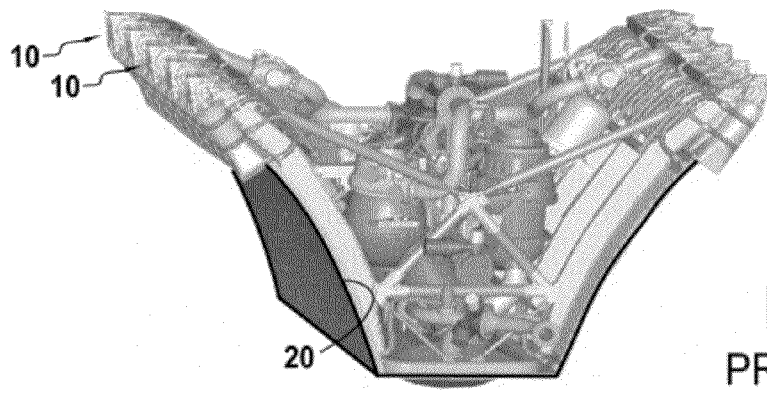
FIG. 6 is a diagrammatic perspective view of an example of a prior art rocket engine nozzle system comprising a rectilinear central core and rows of individual nozzles of rectangular outlet section.
Figure 7:
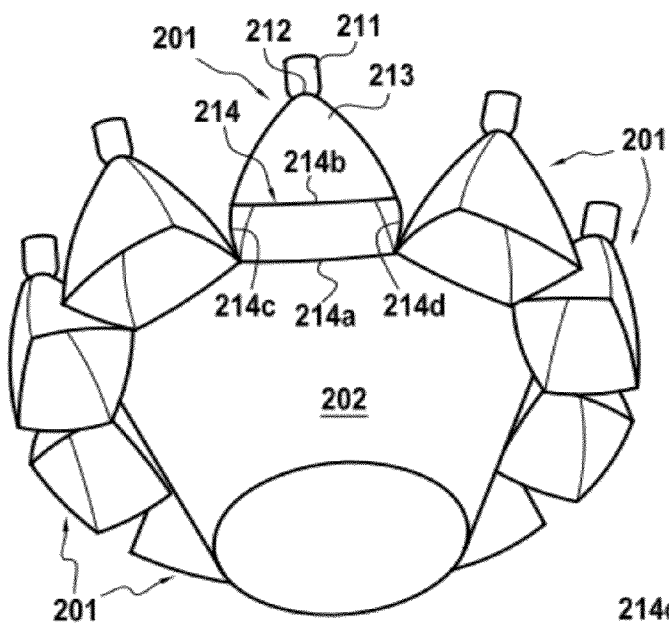
FIG. 7 is a diagrammatic perspective view of an example of a rocket engine nozzle system comprising an axially symmetrical central core and a ring of individual nozzles of outlet section that is essentially rectangular.
Figure 8:
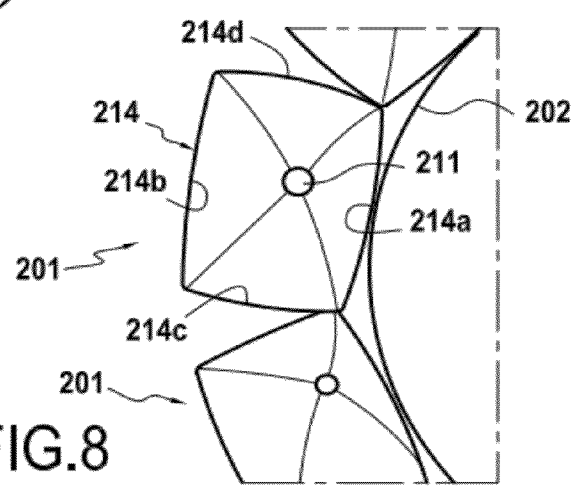
FIG. 8 is a fragmentary plan view of the FIG. 7 rocket engine nozzle system.

FIGS. 3 to 5 show an embodiment of the invention that minimizes the effects of the corners in which the flow tends to concentrate and contributes to maintaining a flow that is as well optimized as possible in each individual nozzle 101 that is co-operating with a central core 102.

In the embodiment of FIGS. 3 to 5, the central core 102 is axially symmetrical, e.g. essentially in the form of a truncated cone, as in the embodiment of FIGS. 1 and 2, and the non-axially symmetrical individual nozzles 101 are distributed in a ring around the central core 102.

FIGS. 3 to 5 show individual nozzles 101 each having a nozzle throat 112 of circular shape connected on its upstream side to a combustion chamber 111 and on its downstream side to a diverging portion 113 that is terminated by an outlet section 114.

The diverging portion 113 of a nozzle 101 presents a profile of elliptical section over the outer portion of the nozzle 101 up to the outlet section 114. It should be observed that optimizing a nozzle 101 may require the meridian profiles of the nozzle to be different in the plane extending radially relative to the central core 102 and in the plane orthogonal thereto.

The outlet section 114 may also be of a shape that retains the general appearance of a trapezoid, however the outer side 114b presents curvature that is highly marked, having a small radius of curvature, much smaller than the radius of curvature of the central core 102 or the radius of curvature of the circular arc of the outer sides 14b in the embodiment of FIGS. 1 and 2.

The lateral sides 114c and 114d of the outlet section 114 of the nozzles 101 are rectilinear and radial, whereas the inner side 114a of each nozzle closely matches the curvature of the central core 102 so as to avoid any gas flow discontinuity at the outlet from a nozzle, at its inner side 114a placed in the vicinity of the central core 102.

The inner side 14a, 114a of an outlet section 14, presents a size that is smaller than the chord defined from the curved outer side 14b, 114b.

What is claimed is:

1. A rocket engine nozzle system, comprising a set of individual nozzles of the rocket engine nozzle system distributed in a ring around a central core of axially symmetrical shape presenting a central axis, wherein each individual nozzle, which is placed at the periphery of the central core, comprises a circular section throat for receiving gas coming from a combustion chamber, and a diverging portion tangential to the central core, and wherein the diverging portion has an outlet section presenting first and second lateral sides that converge radially towards the central axis of the central core, an outer side that is curved with its convex side directed outwards, and an inner side situated in the vicinity of the central core.

2. A system according to claim 1, wherein said inner side situated in the vicinity of the central core is curved with curvature close to that of the central core, and wherein said inner side presents continuity of slope with the central core, in a meridian plane comprising said central axis and a radius of said central core of axially symmetrical shape.

3. A system according to claim 1, wherein said inner side situated in the vicinity of the central core is rectilinear.

4. A system according to claim 1, wherein said outer side presents curvature that constitutes a portion of a circle concentric with the central core.

5. A system according to claim 1, wherein said outer side presents curvature constituting a portion of an ellipse presenting radii smaller than the central core.

6. A system according to claim 1, wherein said first and second lateral sides that converge radially towards said central axis are rectilinear.

7. A system according to claim 1, wherein said first and second lateral sides that converge radially towards said central axis present curvature that is greater than that of the central core.

* * * * *

UNITED STATES PATENT AND TRADEMARK OFFICE
CERTIFICATE OF CORRECTION

PATENT NO. : 8,266,887 B2  
APPLICATION NO. : 12/328166  
DATED : September 18, 2012  
INVENTOR(S) : Didier Vuillamy et al.

Page 1 of 1

It is certified that error appears in the above-identified patent and that said Letters Patent is hereby corrected as shown below:

In the Specifications:

Column 3, line 39, "axis z" should read --axis $\underline{z}$--;

Column 3, line 37, "core z." should read --core $\underline{z}$.--; and

Column 5, line 7, "14, presents" should read --14, 114 presents--.

Signed and Sealed this  
Third Day of September, 2013

Teresa Stanek Rea  
*Acting Director of the United States Patent and Trademark Office*